(12) United States Patent
Liao et al.

(10) Patent No.: US 8,463,967 B2
(45) Date of Patent: Jun. 11, 2013

(54) METHOD AND DEVICE FOR SCHEDULING QUEUES BASED ON CHAINED LIST

(75) Inventors: Qinglei Liao, Shenzhen (CN); Wei Lai, Shenzhen (CN); Zhiyong Liao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 134 days.

(21) Appl. No.: 13/258,936

(22) PCT Filed: Mar. 24, 2010

(86) PCT No.: PCT/CN2010/071225
§ 371 (c)(1),
(2), (4) Date: Sep. 29, 2011

(87) PCT Pub. No.: WO2010/135926
PCT Pub. Date: Dec. 2, 2010

(65) Prior Publication Data
US 2012/0017055 A1     Jan. 19, 2012

(30) Foreign Application Priority Data
May 26, 2009 (CN) .......................... 2009 1 0085631

(51) Int. Cl.
G06F 3/00     (2006.01)
G06F 13/00     (2006.01)

(52) U.S. Cl.
USPC ........... 710/112; 710/2; 710/5; 710/8; 710/32

(58) Field of Classification Search
None
See application file for complete search history.

(56) References Cited

U.S. PATENT DOCUMENTS 6,661,802 B1    12/2003    Homberg et al.
6,934,294 B2    8/2005    Bertagna
(Continued)

FOREIGN PATENT DOCUMENTS

CN    1322091 A    11/2001
CN    1979424 A    6/2007

OTHER PUBLICATIONS

International Search Report in international application No. PCT/CN2010/071225, mailed on Jul. 1, 2010.

(Continued)

*Primary Examiner* — Scott Sun
(74) *Attorney, Agent, or Firm* — Oppedahl Patent Law Firm LLC

(57) ABSTRACT

The present invention discloses a method for scheduling queues based on a chained list. The method includes the following steps: setting the number of addresses in a queuing chained list not less than the number of queues, and partitioning the queuing chained list into different queuing sub-chained lists according to the priorities of the queues, wherein the number of the addresses in the queuing sub-chained list is not less than the total number of the queues whose priorities correspond to the queuing sub-chained list; setting for each queue a queuing chained list identifier identifying whether the each queue has queued in the queuing chained list; determining whether a queue satisfying queuing criteria has queued in the queuing chained list according to the queuing chained list identifier of the queue before the queue is added to the queuing chained list; if it has queued, adding is not processed, otherwise, the queue is added to the end of the queuing sub-chained list which corresponds to the priority of the queue, and the queuing chained list identifier of the queue is modified to an identifier identifying the queue has already queued in the queuing chained list. The present invention also discloses a device for scheduling queues based on a chained list. The present invention ensures impartiality when queues having the same priority are scheduled.

11 Claims, 2 Drawing Sheets

U.S. PATENT DOCUMENTS

| | | | |
|---|---|---|---|
| 7,136,355 | B2 | 11/2006 | Lin et al. |
| 2004/0179535 | A1 | 9/2004 | Bertagna |
| 2004/0213243 | A1 | 10/2004 | Lin et al. |
| 2005/0047425 | A1 | 3/2005 | Liu |
| 2006/0031643 | A1 | 2/2006 | Figueira |
| 2006/0245443 | A1* | 11/2006 | Basso et al. .................. 370/412 |
| 2009/0002864 | A1* | 1/2009 | Duelk et al. .................. 360/48 |

OTHER PUBLICATIONS

English Translation of the Written Opinion of the International Search Authority in international application No. PCT/CN2010/071225, mailed on Jul. 1, 2010.

European search report in European patent application No. 10780008.8 dated Mar. 26, 2013.

* cited by examiner

FIG. 1

```
┌─────────────────────────────────────────────────────────────────┐
│ Stetting the number of addresses in a queuing chained list not  │
│   less than the number of queues, and partitioning the queuing  │
│   chained list into different queuing sub-chained lists         │
│   according to the priorities of the queues, wherein the number │
│   of the addresses in the queuing sub-chained lists is not less │──101
│   than the total number of queues whose priorities correspond   │
│   to the queuing sub-chained lists; setting for each queue a    │
│   queuing chained list identifier identifying whether the each  │
│   queue has queued in the queuing chained list.                 │
└─────────────────────────────────────────────────────────────────┘
                                 │
                                 ▼
┌─────────────────────────────────────────────────────────────────┐
│ Determining whether a queue satisfying queuing criteria has     │
│   queued in the queuing chained list according to the queuing   │
│   chained list identifier of the queue before the queue is      │
│   added to the queuing chained list; if it has, adding is not   │──102
│   processed, otherwise, the queue is added to the end of the    │
│   queuing sub-chained list which corresponds to the priority of │
│   the queue, and the queuing chained list identifier of the     │
│   queue is modified to an identifier identifying the queue has  │
│   already queued in the queuing chained list.                   │
└─────────────────────────────────────────────────────────────────┘
```

METHOD AND DEVICE FOR SCHEDULING QUEUES BASED ON CHAINED LIST

TECHNICAL FIELD

The present invention relates to queue scheduling techniques, particularly to a method and a device for scheduling queues based on a chained list in combination with a plurality of scheduling techniques.

BACKGROUND

Queue scheduling is to arbitrate dequeuing criteria of queues by checking a triggering, for example, receiving an authorized triggering, and to schedule the dequeuing of the queues orderly according to specific rules. Common scheduling algorithms mainly include a Round Robin (RR) scheduling algorithm, a Strict Priority (SP) scheduling algorithm, etc.

The principle for the implementation of the RR scheduling algorithm is to dequeue queues one by one by RR in a specific order. In each clock period, one queue is dequeued, and in next clock period, next queue is dequeued by RR. The SP scheduling algorithm is to set different priorities for queues and dequeue a queue with the highest priority each time, while a queue with a low priority can be dequeued only when none of the queues with a higher priority meets the dequeuing criteria.

At present, when the output of a plurality of queues with a plurality of priorities is scheduled, a typical method is to make queues with the same priority cache and queue by using a First Input First Output (FIFO) queue at first, and then schedule the output of queues with different priorities which are in a queue for FIFO through SP.

The principle of FIFO is that the one entering first shall get service first, therefore a queue may enter the FIFO queue to queue repeatedly. If the queue has a large traffic, it will queue repeatedly in the FIFO queue. Consequently, queues with the same priority and a lower traffic are unable to get service in a long time and may be scheduled only after queues with a higher traffic have been dequeued many times. It fails to reflect the idea that queues with the same priority should be dequeued by RR fairly, resulting in unfairness in dequeuing. Another problem is that when there are many queues, there is a risk of FIFO overflow. In order to avoid this phenomenon, lager FIFO queues need to be configured, which will consume huge Random Access Memory (RAM) resources. An example of a large number of queues and queue priorities is 32K queues and 6 queue priorities. In this case, in order to avoid overflow, at least six FIFOs with a depth of 32K will be needed, which will undoubtedly consume remarkable RAM resources. However, a considerable portion of the configured RAM resources can not be used all the time, resulting in serious waste of resources.

SUMMARY

In view of this, the main object of the present invention is to provide a method and a device for scheduling queues based on a chained list, which can ensure the queues with the same priority are fairly scheduled while ensuring the SP scheduling algorithm.

To realize the foregoing object, the technical scheme of the present invention is realized in the following way.

A method for scheduling queues based on a chained list, comprising:

stetting the number of addresses in a queuing chained list not less than the number of queues, and partitioning the queuing chained list into different queuing sub-chained lists according to priorities of the queues, wherein the number of the addresses in the queuing sub-chained lists is not less than the total number of queues whose priorities correspond to the queuing sub-chained lists; setting for each queue a queuing chained list identifier identifying whether the each queue has queued in the queuing chained list; and determining whether a queue satisfying queuing criteria has queued in the queuing chained list according to a queuing chained list identifier of the queue before the queue is added to the queuing chained list; if the queue has queued, not processing adding, otherwise, adding the queue to the end of a queuing sub-chained list which corresponds to the priority of the queue, and modifying the queuing chained list identifier of the queue to an identifier identifying the queue has already queued in the queuing chained list.

Preferably, the method may further comprise:

selecting a non-empty queuing sub-chained list with the highest priority in the queuing chained list to schedule queues, and selecting a non-empty queuing sub-chained list with the second highest priority to schedule queues after the non-empty queuing sub-chained list with the highest priority completes the scheduling.

Preferably, queue scheduling in a queuing sub-chained list may start from the head of the chained list and proceed according to an indication of a pointer of the chained list.

Preferably, the method may further comprise: adding a dequeued queue to the queuing chained list preferentially when the dequeued queue and a queue to be enqueued both satisfy the queuing criteria.

Preferably, the queuing chained list identifier may be of 1 bit, wherein 0 means queueing in the queuing chained list, and 1 means not queueing in the queuing chained list; or 0 means not queueing in the queuing chained list, and 1 means queueing in the queuing chained list.

Preferably, each queue number may correspond to an address in the queuing chained list.

A device for scheduling queues based on a chained list, comprising:

a setting unit, for stetting the number of addresses in a queuing chained list not less than the number of total queues, and, setting for each queue a queuing chained list identifier identifying whether the each queue has queued in the queuing chained list;

a partitioning unit, for partitioning the queuing chained list into different queuing sub-chained lists according to priorities of the queues, wherein the number of the addresses in the queuing sub-chained lists is not less than the total number of queues whose priorities correspond to the queuing sub-chained lists;

a determining unit, for determining whether a queue satisfying queuing criteria has queued in the queuing chained list according to a queuing chained list identifier of the queue before the queue is added to the queuing chained list; if the queue has queued, not processing adding, otherwise, triggering an adding unit;

an adding unit, for adding the queue to the end of a queuing sub-chained list which corresponds to the priority of the queue, and triggering an identifier modifying unit; and an identifier modifying unit, for modifying the queuing chained list identifier of the queue to an identifier identifying the queue has already queued in the queuing chained list.

Preferably, the device may further comprise:

a scheduling unit, for selecting a queuing sub-chained list with the highest priority in the queuing chained list to schedule queues, and selecting a queuing sub-chained list with the second highest priority to schedule queues after the queuing sub-chained list with the highest priority completes the scheduling.

Preferably, when the scheduling unit schedules queues in a queuing sub-chained list, it may schedule the queues starting from the head of the chained list and proceed according to an indication of a pointer of the chained list.

Preferably, when a dequeued queue and a queue to be enqueued both satisfy the queuing criteria, the dequeued queue may be added to the queuing chained list preferentially.

Preferably, each queue number may correspond to an address in the queuing chained list.

In the present invention, the number of addresses in a queuing chained list is set according to the number of queues and is not less than the number of queues; then different queuing sub-chained lists are set in the queuing chained list according to the priorities of the queues; when a queue is enqueued, a queuing sub-chained list to which the priority of the queue corresponds is selected; before the queue is added to the queuing sub-chained list, it is determined whether the queue has queued in the queuing sub-chained list; if it has, adding is not processed, otherwise, adding is processed. During scheduling, a non-empty queuing sub-chained list with the highest priority in the queuing chained list is selected, and queue scheduling starts from the head of the chained list and proceeds according to an indication of a pointer of the chained list; after the queue scheduling in the selected non-empty queuing sub-chained list is completed, a queuing sub-chained list with the second highest priority is selected to schedule queues. When the present invention processes queues with the same priority, it schedules the queues based on the principle of FIFO, but the queues that have been queued in the queuing chained list can not be added to the queuing chained list again, thereby ensuring impartiality when the queues having the same priority are scheduled.

BRIEF DESCRIPTION OF THE DRAWINGS

FIG. 1 is a flow chart of a method for scheduling queues based on a chained list according to the present invention;

DETAILED DESCRIPTION OF THE INVENTION

Figure 2:
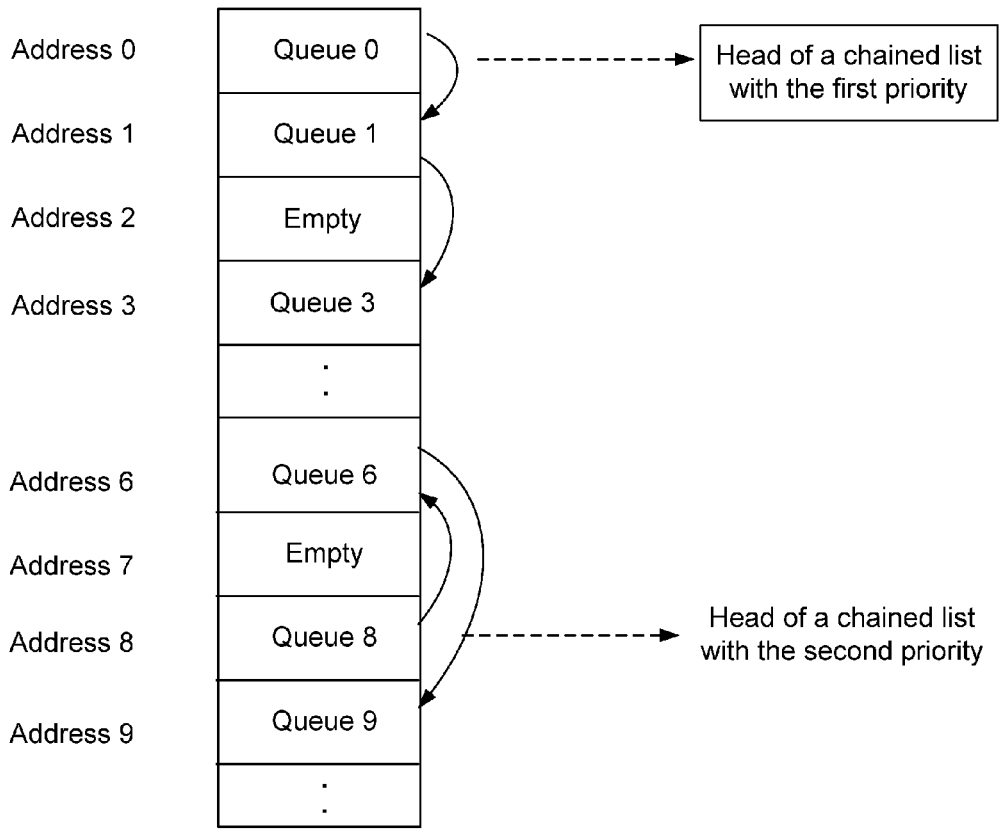
FIG. 2 is a structural schematic diagram of adding a queue to a queuing sub-chained list according to the present invention.

The basic idea of the present invention is: the number of addresses in a queuing chained list is set according to the number of queues and is not less than the number of the queues; then different queuing sub-chained lists are set in the queuing chained list according to the priorities of the queues; when a queue is enqueued, a queuing sub-chained list to which the priority of the queue corresponds is selected; before the queue is added to the queuing sub-chained list, it is determined whether the queue has queued in the queuing sub-chained list, if it has queued, adding is not processed, otherwise, adding is processed. When scheduling, a non-empty queuing sub-chained list with the highest priority in the queuing chained list is selected. the queue scheduling starts from the head of the chained list and proceeds according to an indication of a pointer of the chained list; after the selected non-empty queuing sub-chained list completes the scheduling, a non-empty queuing sub-chained list with the second highest priority is selected to schedule queues. When the present invention processes queues with the same priority, it schedules the queues based on the principle of FIFO, but the queues that have queued in the queuing chained list can not be added to the queuing chained list again, thereby ensuring impartiality when the queues having the same priority are scheduled.

The present invention will now be described in combination with an embodiment with reference to the accompanying drawings, from which its object, technical scheme and advantages will be more clearly.

FIG. 1 is a flow chart of a method for scheduling queues based on a chained list according to the present invention. As shown in FIG. 1, the method for scheduling queues based on a chained list according to the present invention comprises the following steps:

S101: stetting the number of addresses in a queuing chained list not less than the number of queues, and partitioning the queuing chained list into different queuing sub-chained lists according to the priorities of the queues, wherein the number of the addresses in the queuing sub-chained lists is not less than the total number of queues whose priorities correspond to the queuing sub-chained lists; and setting for each queue a queuing chained list identifier identifying whether the each queue has queued in the queuing chained list.

The number of addresses in the queuing chained list is set according to the number of all queues in a system. Taking the 32K queues in the background of the invention for example, the number of addresses in the queuing chained list is set to be 32K at least, the addresses in the queuing chained list needs to be carried by characters of at least 15 bits, i.e., each queue needs a corresponding address in the queuing chained list, to store itself during adding of the each queue. When the queuing chained list is partitioned into different queuing sub-chained lists according to the priorities of the queues so as to make queues with corresponding priorities queue, the queues with a corresponding priority are added to a queuing sub-chained list with the corresponding priority, and the number of addresses in the queuing sub-chained list cannot be less than the number of the queues with this priority so that all the queues with this priority can queue in the corresponding queuing sub-chained list. In the present invention, queues mainly refer to data queues belonging to different users. The best way is one-to-one correspondence between the number of addresses in the queuing sub-chained list and all queues.

Meanwhile, a queuing chained list identifier identifying whether a queue has queued in the queuing chained list is set for each queue. The queuing chained list identifier is a character of 1 bit, wherein 0 means queuing in the queuing chained list, and 1 means not queuing in the queuing chained list; or 0 means not queuing in the queuing chained list, and 1 means queuing in the queuing chained list. In the present invention, a queuing chained list identifier address of a queue corresponds to the serial number of the queue so that the queuing chained list identifier corresponding to the queue can be easily found.

S102: determining whether a queue satisfying the queuing criteria has queued in the queuing chained list according to the queuing chained list identifier of the queue before the queue is added to the queuing chained list; if it has queued, then adding is not processed, otherwise, the queue is added to the end of a queuing sub-chained list which corresponds to the priority of the queue, and the queuing chained list identifier of the queue is modified to an identifier identifying the queue has already queued in the queuing chained list.

After the setting of the queuing chained list is completed, queues satisfying the queuing criteria are determined. The queues satisfying the queuing criteria are added to the queuing chained list. Specifically, before a queue is added to the queuing chained list, its priority needs to be determined, and then the queuing chained list identifier of the queue is checked and whether it has queued in the queuing chained list is determined, if it has, it will not be processed, i.e., it will not be added to the queuing chained list, otherwise, it will be added to a queuing sub-chained list corresponding to its priority. Below detailed description will be given through an example.

Suppose the queue numbers of the queues queuing in order are: 35, 13, 0, 8, 0, 6, 1, 64, 0, 3, 55, 30, 20, 80, 9, 101, . . . , wherein queues 0, 1, 3 belong to the first priority, i.e., the highest priority, queues 6, 8, 9 belong to the second priority, queues 13, 20, 30, 35 belong to the third priority, and queues 80, 64, 55, 101 belong to the fourth priority. Suppose all the queues satisfy the queuing criteria. Queue 35 is the first to queue, when the content of queuing chained list identifier address 35 is queried and found to be 0, the queue 35 will be added to the queuing chained list, and meanwhile, the queuing chained list identifier of the address will be modified to 1. Here the addresses of the queuing chained list identifiers correspond to the sequence of the queues one to one, thus making the search for a queuing chained list identifier of a queue very easy. Supposing 0 means a queue does not queue in the queuing chained list, and 1 means the queue has queued in the queuing chained list, when the queuing chained list identifier address 35 is found to be 1, it means the queue has queued in the chained list, so the enqueuing of the queue will not be processed. According to the enqueuing order, queuing chained list identifiers are searched for the subsequent queues 13, 0, 8, 0 in turn. When a queuing chained list identifier is searched again for the queue 0, if it is found that the queue has existed in the chained list, it will not be added to the queuing chained list.

The number of addresses in the queuing chained list corresponds to queue numbers or the number of queues, and each queue has a queuing address. When the present invention adds a queue to the queuing chained list, it adds the queue to a queuing sub-chained list with a corresponding priority according to the priority of the queue. Still take the queues with foregoing queue numbers for example. In a queuing sub-chained list with the first priority, queues 0, 1, 3 are added in turn. FIG. 2 is a structural schematic diagram of adding a queue to a queuing sub-chained list according to the present invention. As shown in FIG. 2, queuing sub-chained list address 0 is the beginning address of the chained list and stores the queue 0, address 1 stores the queue 1, and address 3 stores the queue 3. As only 3 queues are added to the queuing sub-chained list, the next-hop address of an address 3 pointer is the end address of the chained list and the content is empty. When queues are added to a queuing sub-chained list, the queues are stored starting from the end address of the queuing sub-chained list. When the foregoing queues 0, 1, 3 are added to the queuing sub-chained list, if the queue 0 is added, as the queuing sub-chained list with the first priority is empty, the address 0 is the end address of the chained list. The queue 0 is stored in the address 0. In this case, the address 1 is the end address of the chained list, and the queue 1 is added to the address 1. As shown in FIG. 2, the queues with the second priority, such as queues 8, 6, 9 described above, are added to a queuing sub-chained list by the foregoing method, too. In the queuing sub-chained list with the second priority, the beginning address may be address 8. The next-hop address of the address 8 is address 6 and stores the queue 6. The next-hop address of the address 6 is address 9 and stores the queue 9. The queues are stored strictly according to address pointers in the queuing sub-chained list. The beginning address stores a queue which is added first, and then all the other queues are stored into the queuing sub-chained list in order till its end address.

The preferred implementation method of the present invention is that the number of addresses is equal to the number of queues and in this case, the number of queues corresponds to the number of addresses one to one. In the present invention, the number of addresses can be greater than the number of queues, provided it ensures that an address does not correspond to different queues.

The present invention is described only by taking the adding of the queues with the first and second priorities to the queuing sub-chained lists for example. Queues with other priorities are added to queuing sub-chained lists with corresponding priorities by the same method, no further description will be given here.

The present invention further includes: selecting a non-empty queuing sub-chained list with the highest priority in the queuing chained list to schedule queues, and then selecting a non-empty queuing sub-chained list with the second highest priority to schedule queues after the non-empty queuing sub-chained list with the highest priority completes the scheduling. During queue scheduling in a queuing sub-chained list, a queue is output from the head of the queuing sub-chained list first, and then the dequeuing of next queue is scheduled according to an indication of a head pointer of the queuing sub-chained list till the queuing sub-chained list is empty.

Take the foregoing queues for example. If the output order of queues with the first priority is 0, 1, 3, . . . , then a non-empty queuing sub-chained list with the current highest priority is searched out after the queues in the queuing sub-chained list corresponding to the first priority are scheduled. If it is a queuing sub-chained list with the second priority, then its queue output order is 8, 6, 9, . . . . Then a queuing sub-chained list with the third priority is followed and its queue output order is 35, 13, 30, 20, . . . .

Figure 3:
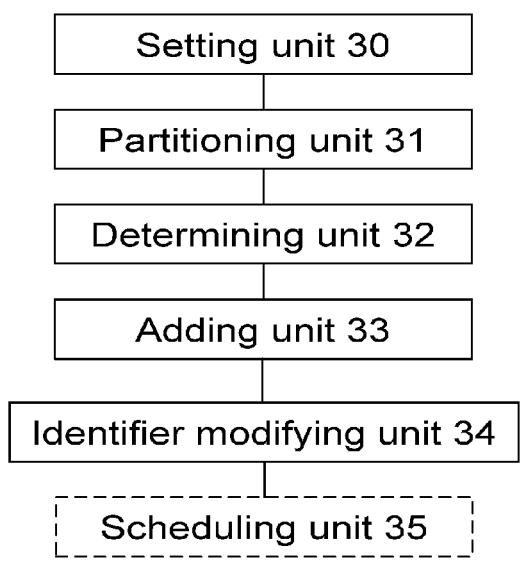
FIG. 3 is a structural schematic diagram of the composition of a device for scheduling queues based on a chained list according to the present invention.

FIG. 3 is a structural schematic diagram of the composition of a device for scheduling queues based on a chained list according to the present invention. As shown in FIG. 3, the device for scheduling queues based on a chained list according to the present invention comprises a setting unit 30, a partitioning unit 31, a determining unit 32, an adding unit 33 and an identifier modifying unit 34, wherein the setting unit 30 is for stetting the number of addresses in a queuing chained list not less than the number of total queues, and, setting for each queue a queuing chained list identifier identifying whether the each queue has queued in the queuing chained list; the partitioning unit 31 is for partitioning the queuing chained list into different queuing sub-chained lists according to the priorities of the queues, wherein the number of the addresses in the queuing sub-chained lists is not less than the total number of queues whose priorities correspond to the queuing sub-chained lists; the determining unit 32 is for determining whether a queue satisfying queuing criteria has queued in the queuing chained list according to the queuing chained list identifier of the queue before the queue is added to the queuing chained list, if it has queued, adding is not processed, otherwise, the adding unit 33 is triggered; the adding unit 33 is for adding the queue to the end of a queuing sub-chained list which corresponds to the priority of the queue, and triggering the identifier modifying unit 34; and the identifier modifying unit 34 is for modifying the queuing chained list identifier of the queue to an identifier identifying the queue has already queued in the queuing chained list.

As shown in FIG. 3, the device for scheduling queues based on a chained list according to the present invention further comprises a scheduling unit 35, for selecting a queuing sub-chained list with the highest priority in the queuing chained list to schedule queues, and selecting a queuing sub-chained list with the second highest priority to schedule queues after the queuing sub-chained list with the highest priority completes the scheduling.

Those skilled in the art should understand the scheduling unit 35 is configured to optimize the technical scheme of the device for scheduling queues based on a chained list according to the present invention and is not a necessary component for the realization of the technical scheme of the present invention.

Those skilled in the art should understand the device for scheduling queues based on a chained list as shown in FIG. 3 of the present invention is designed to realize the method for scheduling queues based on a chained list as shown in FIG. 1, the implementation functions of the processing units and processing modules of the devices shown in FIG. 3 can be understood with reference to the related descriptions in the method shown in FIG. 1, and the functions of each unit and module can be realized through programs running in a processor or through corresponding logic circuits.

The foregoing descriptions are only the preferred embodiments of the present invention and are not intended to limit the protection scope of the present invention.

The invention claimed is:

1. A method for scheduling queues based on a chained list, comprising:
   stetting the number of addresses in a queuing chained list not less than the number of queues, and partitioning the queuing chained list into different queuing sub-chained lists according to priorities of the queues, wherein the number of the addresses in the queuing sub-chained lists is not less than the total number of queues whose priorities correspond to the queuing sub-chained lists; setting for each queue a queuing chained list identifier identifying whether the each queue has queued in the queuing chained list; and
   determining whether a queue satisfying queuing criteria has queued in the queuing chained list according to a queuing chained list identifier of the queue before the queue is added to the queuing chained list; if the queue has queued, not processing adding, otherwise, adding the queue to the end of a queuing sub-chained list which corresponds to the priority of the queue, and modifying the queuing chained list identifier of the queue to an identifier identifying the queue has already queued in the queuing chained list.

2. The method according to claim 1, further comprising:
   selecting a non-empty queuing sub-chained list with the highest priority in the queuing chained list to schedule queues, and selecting a non-empty queuing sub-chained list with the second highest priority to schedule queues after the non-empty queuing sub-chained list with the highest priority completes the scheduling.

3. The method according to claim 2, further comprising:
   starting queue scheduling in a queuing sub-chained list from the head of the chained list and proceeding according to an indication of a pointer of the chained list.

4. The method according to claim 1, further comprising:
   adding a dequeued queue to the queuing chained list preferentially when the dequeued queue and a queue to be enqueued both satisfy the queuing criteria.

5. The method according to claim 1, wherein the queuing chained list identifier is of 1 bit, 0 meaning queuing in the queuing chained list, and 1 meaning not queuing in the queuing chained list; or 0 meaning not queuing in the queuing chained list, and 1 meaning queuing in the queuing chained list.

6. The method according to claim 1, wherein each queue number corresponds to an address in the queuing chained list.

7. A device for scheduling queues based on a chained list, comprising: a setting unit, a partitioning unit, a determining unit, an adding unit and an identifier modifying unit, wherein:
   the setting unit is for stetting the number of addresses in a queuing chained list not less than the number of total queues, and, setting for each queue a queuing chained list identifier identifying whether the each queue has queued in the queuing chained list;
   the partitioning unit is for partitioning the queuing chained list into different queuing sub-chained lists according to priorities of the queues, wherein the number of the addresses in the queuing sub-chained lists is not less than the total number of queues whose priorities correspond to the queuing sub-chained lists;
   the determining unit is for determining whether a queue satisfying queuing criteria has queued in the queuing chained list according to a queuing chained list identifier of the queue before the queue is added to the queuing chained list; if the queue has queued, not processing adding, otherwise, triggering the adding unit;
   the adding unit is for adding the queue to the end of a queuing sub-chained list which corresponds to the priority of the queue, and triggering the identifier modifying unit; and
   the identifier modifying unit is for modifying the queuing chained list identifier of the queue to an identifier identifying the queue has already queued in the queuing chained list.

8. The device according to claim 7, further comprising:
   a scheduling unit, for selecting a queuing sub-chained list with the highest priority in the queuing chained list to schedule queues, and selecting a queuing sub-chained list with the second highest priority to schedule queues after the queuing sub-chained list with the highest priority completes the scheduling.

9. The device according to claim 8, wherein when the scheduling unit schedules queues in a queuing sub-chained list, it schedules the queues starting from the head of the chained list and proceed according to an indication of a pointer of the chained list.

10. The device according to claim 7, wherein when a dequeued queue and a queue to be enqueued both satisfy the queuing criteria, the dequeued queue is added to the queuing chained list preferentially.

11. The device according to claim 7, wherein each queue number corresponds to an address in the queuing chained list.

* * * * *